W. BLEISS.
ORNAMENTAL GLASS PANELS.

No. 185,013. Patented Dec. 5, 1876.

WITNESSES:
Cnas Nida
John Goethals.

INVENTOR:
Wm Bleiss.
BY Munn & Co.
ATTORNEYS.

UNITED STATES PATENT OFFICE.

WILLIAM BLEISS, OF NEW YORK, N. Y.

IMPROVEMENT IN ORNAMENTAL GLASS PANELS.

Specification forming part of Letters Patent No. 185,013, dated December 5, 1876; application filed September 9, 1876.

*To all whom it may concern:*

Figure 1:
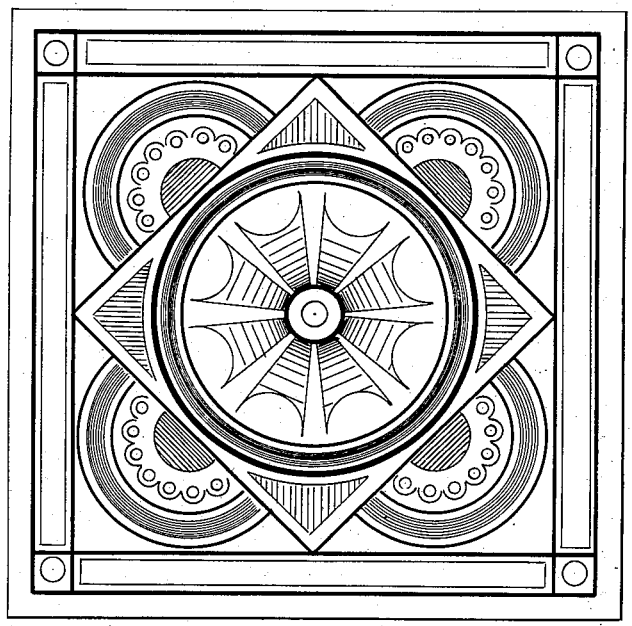
Figure 2:

Be it known that I, WILLIAM BLEISS, of the city, county, and State of New York, have invented certain Improvements in Ornamental Glass Panels or Tiles, of which the following is a specification:

In the accompanying drawing, Figure 1 is a face view of my improved panel. Fig. 2 is a transverse section on line $x$ $x$ in Fig. 1.

Similar letters of reference indicate corresponding parts.

The invention consists of a glass plate having a design at the back upon a roughened surface, the said design being in opaque colors, relieved by a filling in of transparent colors, and provided with a back layer of gold-leaf, surrounded by a coat of cement or paint. The design is intended to be seen by looking through the glass from the smooth side.

To produce my ornamental panel, I take glass having a roughened or crystalized surface, and trace thereon a design in suitable colors to represent the seams between the pieces composing a mosaic. Transparent colors are then laid over portions of the work, and gold-leaf is laid over the entire surface of the glass, and a backing added, which is composed of equal parts of white and red lead, patent drier, and Japan gold-size. The proportions of this backing may be changed, or any material that will protect the surface and form a durable coating may be used.

In Fig. 2, $a$ represents the glass, $b$ the material forming the design, and $c$ the backing.

A panel thus prepared will not peel, crack, or blister. It is durable, and may be used for interior or exterior decorations for signs, tiling, borders, and many other purposes.

Having thus described my invention, what I claim as new, and desire to secure by Letters Patent, is—

As a new article of manufacture, an ornamental glass panel, the same consisting of a plate of glass having a rough or crystallized surface at the back, upon which surface is a design in opaque and transparent colors, backed with gold-leaf, the whole provided with a protecting-back of cement or paint, substantially as shown and described.

WILLIAM BLEISS.

Witnesses:
C. SEDGWICK,
ALEX. F. ROBERTS.